(No Model.)
W. CHISHOLM.
DIE FOR FORMING SHOVEL STRAPS.
No. 261,674. Patented July 25, 1882.
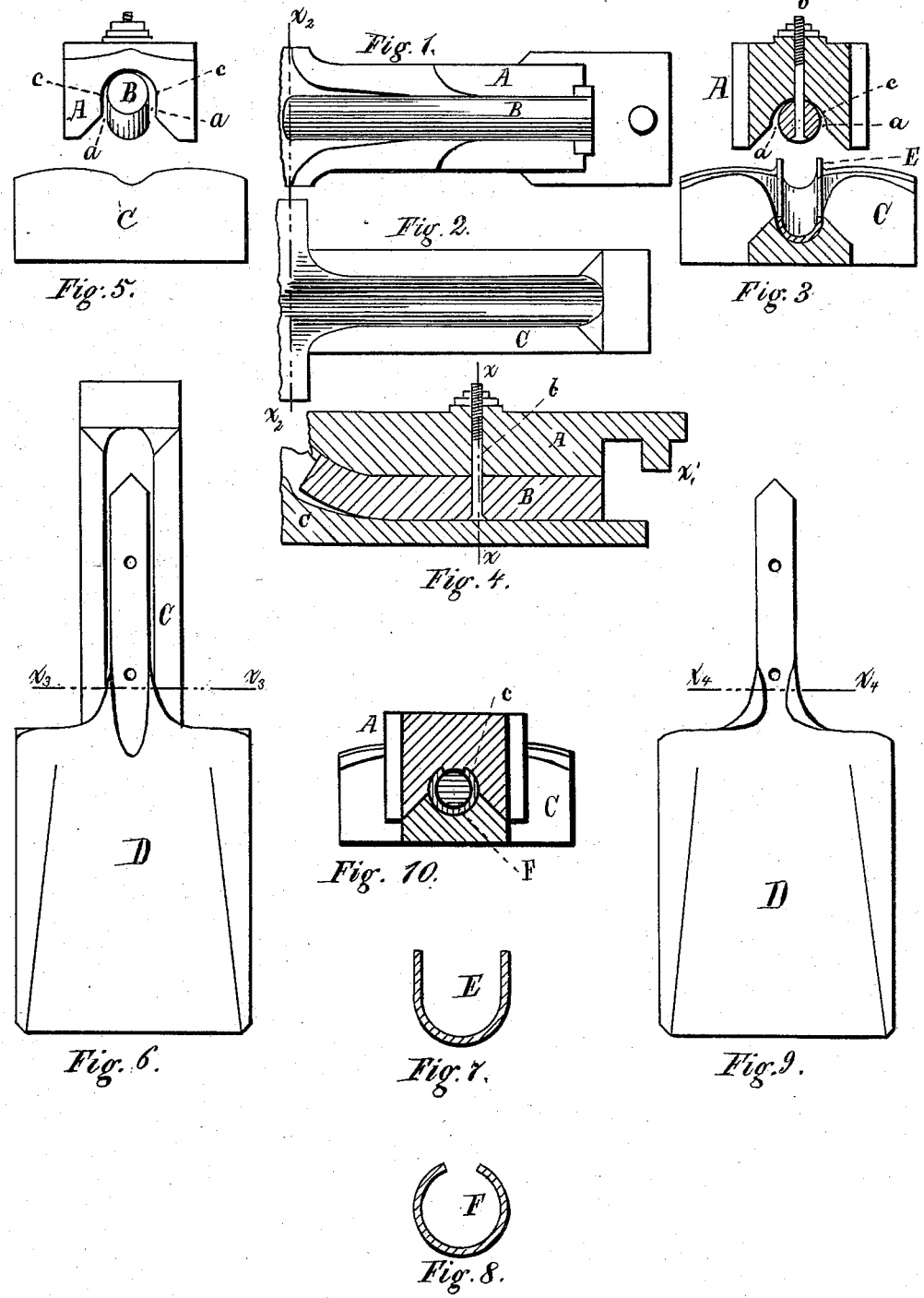

UNITED STATES PATENT OFFICE.

WILLIAM CHISHOLM, OF CLEVELAND, OHIO.

DIE FOR FORMING SHOVEL-STRAPS.

SPECIFICATION forming part of Letters Patent No. 261,674, dated July 25, 1882.

Application filed February 25, 1882. (No model.)

*To all whom it may concern:*

Be it known that I, WILLIAM CHISHOLM, of Cleveland, in the county of Cuyahoga and State of Ohio, have invented a certain new and useful Improvement in Dies for Forming Shovel-Straps; and I do hereby declare that the following is a full, clear, and complete description thereof.

The nature of my improvement relates to the dies for forming the straps of shovels, scoops, spades, forks, and other articles having straps or strap-sockets to connect the article to the handle.

In the description reference will be made to shovels for brevity, as an example, as the improvement would be the same when applied to other articles.

The object of the improvement is for completing the forming of the strap or strap-socket into the proper shape for the handle.

The mechanism, individually considered, for shaping the blank into the form of a shovel is not separately held or claimed herein to be new, as such mechanism has been set forth in a patent granted to me, and to which I preferably apply the said improvement, although it may be used, in connection with other devices, for making shovels and other like articles without departing from the nature of my invention.

For a more full and complete description of said improvement reference will be had to the following specification and to the annexed drawings, making part of the same, in which—

Figure 1 is a plan view of the upper part of the shank-dies for shaping the shovel shank or socket. Fig. 2 is a plan view of the lower shank-die. Fig. 3 is a transverse section in direction of the line $x\ x$ in Fig. 4, viewed from the end $x'$. Fig. 4 is a longitudinal section of Figs. 1 and 2 together. Fig. 5 is a front end view of Figs. 1, 2, 3, as seen at or in direction of the line $x^2\ x^2$, Figs. 1 and 2. Fig. 6 represents a shovel with its partially-formed socket D or strap upon the lower shank-die, C. Fig. 7 represents the form of the socket or strap for the shank-dies; Fig. 8, the shape of the strap or socket after leaving the said dies. Fig. 9 represents the shovel with the strap formed. Fig. 10 is a view of the dies together in cross-section, with the socket formed therein.

Like letters of reference denote like parts in the several views.

The blade of the shovel is first formed from the blank plate by means of dies, and the shank is partially shaped thereby and then completed by the shank-dies, in which A, Figs. 1, 3, 4, is the upper die, in which is secured a forming-mandrel, B, which is of a curve and form corresponding to the shape required for the strap or socket. This mandrel B is attached, by bolting or otherwise, at $b$, to the upper die, A, by which the form and shape of the straps are completed.

The dies A C may be designated as the "finishing-dies," and complete the forming and shaping of the socket or strap of the shovel D, Figs. 6 and 9.

The general form of the dies for forming the shovel-blade may be of any desired shape required for the blade of a shovel, spade, scoop, fork, &c., to which my improvement may be applied.

When the shovel D has received its primary shape by the action of such dies on the blank-plate, as seen in Fig. 6, the socket or strap adjoining the blade is U-shaped in cross-section, $x^3\ x^3$, Fig. 6, as seen in Fig. 7. The shank of the article is then placed upon the shank-die C, with the partially-formed socket E, as indicated in Fig. 3, resting upon the lower die. While the metal is still hot the upper die, A, which is a counterpart of the lower one, is brought down upon the die C. As the said upper and lower dies are being brought in contact with the shank between them the U-shaped part of the strap is forced into the space $a$, formed between the mandrel B and the shank part A of the die, as seen in Figs. 3 and 5. This compression of the dies upon the shank or strap causes it to be bent around the mandrel B, changing the form from the U shape to that of round or circular, as at F, Fig. 8.

The position of the shank when formed around the mandrel is seen in Fig. 10. The pressure of the upper die upon the U part of the shank, as it is brought in contact with the curved face $c$ of the shank part of the die, forces the hot metal plate as it enters the space $a$ around the mandrel B, thus changing the form from E to F, as seen in Figs. 8 and 10, F being a cross-section, $x^4\ x^4$, Fig. 9, The longitudinal form of the mandrel B and the strap or socket parts A C of the dies are made to conform to the relative position of the handle with the blade when secured together. The mandrel is made with the same bend and shape as that given to the handle in the shovel.

I am aware that straps and sockets of shovels and other similar articles have been formed during the compressing or swaging of the blank plate into shape; but what distinguishes my improvement is the mode of forming the U-shaped portion of the shank or strap into a circular shape in cross-section, or nearly so, and extending more or less in the length of the strap or socket by means of the dies and mandrel.

The length of the circular portion F will be determined by the relative construction of the mandrel B and section A of the upper die, arranged to allow more or less of the plate to lap longitudinally around the mandrel B by extending the space $a$ in accordance with the length of the socket to be formed.

To remove the shovel from the dies after the socket is formed, the operator need only to pull the shovel toward him, as the socket will then slip off readily from the mandrel.

The described dies can be arranged in connection with any suitable motor or means by which they may be operated.

What I claim as my improvement, and desire to secure by Letters Patent, is—

1. For forming the shanks of shovels and other like articles, the combination of a mandrel with the shank or socket dies, the said mandrel being secured to the die A, whereby the shank or socket of the shovel is compressed around said mandrel into a circular form, or nearly so, in cross-section, and in length more or less along the strap or socket, substantially as set forth.

2. In combination with the upper die for forming the straps or shanks of shovels, the mandrel B, connected thereto, arranged in such relation to said die as to admit of the space $a$ between the mandrel and die-face for the admission of the metal plate in forming and completing said shank, in connection with the die C, substantially in the manner as described.

3. In combination with dies for forming the shanks and sockets of shovels, &c., the mandrel B, secured to the die A, formed to correspond to the curve, bend, and shape of that portion of the handle secured in the said socket or shank, substantially as described, and for the purpose set forth.

In testimony whereof I affix my signature in presence of two witnesses.

WILLIAM CHISHOLM.

Witnesses:
J. H. BURRIDGE,
W. H. BURRIDGE.